(12) United States Patent
Swisher et al.

(10) Patent No.: US 11,260,919 B2
(45) Date of Patent: Mar. 1, 2022

(54) ASSEMBLY FOR CONVERTING A WHEEL DRIVE HARVESTER TO TRACK DRIVE

(71) Applicants: Don E. Swisher, Inman, KS (US); Glyn Jordan, Collinston, LA (US)

(72) Inventors: Don E. Swisher, Inman, KS (US); Glyn Jordan, Collinston, LA (US)

( * ) Notice: Subject to any disclaimer, the term of this patent is extended or adjusted under 35 U.S.C. 154(b) by 275 days.

(21) Appl. No.: 16/539,748

(22) Filed: Aug. 13, 2019

(65) Prior Publication Data
US 2020/0039589 A1 Feb. 6, 2020

Related U.S. Application Data

(60) Provisional application No. 62/719,287, filed on Aug. 17, 2018.

(51) Int. Cl.
*B62D 55/04* (2006.01)
*B62D 55/125* (2006.01)
*B62D 55/084* (2006.01)

(52) U.S. Cl.
CPC ........... *B62D 55/04* (2013.01); *B62D 55/125* (2013.01); *B62D 55/084* (2013.01)

(58) Field of Classification Search
CPC .... B62D 55/04; B62D 55/125; B62D 55/084; B62D 55/08; B62D 5/42
See application file for complete search history.

(56) References Cited

U.S. PATENT DOCUMENTS

| 2,063,035 | A | * | 12/1936 | Fuller | B62D 55/0842 |
| | | | | | 180/9.5 |
| 4,448,273 | A | * | 5/1984 | Barbieri | B62D 55/065 |
| | | | | | 180/9.21 |
| 5,072,800 | A | * | 12/1991 | Price | B62D 55/08 |
| | | | | | 180/9.48 |
| 5,855,248 | A | * | 1/1999 | Rawson | B62D 55/04 |
| | | | | | 180/9.21 |
| 8,801,115 | B2 | | 8/2014 | Hansen | |
| 9,505,454 | B1 | | 11/2016 | Kautsch | |
| 9,975,591 | B2 | | 5/2018 | Bair | |

(Continued)

FOREIGN PATENT DOCUMENTS

EP 2653370 A1 * 10/2013 ............. B62D 55/06

*Primary Examiner* — Jacob D Knutson
*Assistant Examiner* — Abigail R Hymel
(74) *Attorney, Agent, or Firm* — Kenneth H. Jack; Davis & Jack, L.L.C.

(57) ABSTRACT

A retrofit assembly for conversion of a wheel driven vehicle to track drive, the vehicle having an undercarriage and left and right final drive mounts, the assembly incorporating left and right setback arms attached to and extending rearwardly from the vehicle's left and right final drive mounts; a "U" bracket having left and right "U" arms, the "U" bracket being fitted for laterally spanning the vehicle's undercarriage, wherein distal ends of the left and right "U" arms are fixedly attached to rearward ends of the left and right setback arms, and wherein forward ends of the setback arms are fixedly attached to the vehicle's left and right final drive mounts; left and right final drives respectively fixedly attached to the rearward ends of the left and right setback arms; and left and right sprocket driven tracks, wherein the track's sprockets are fixedly attached to the left and right final drives.

6 Claims, 8 Drawing Sheets

(56) References Cited

U.S. PATENT DOCUMENTS

| | | | |
|---|---|---|---|
| 2015/0048671 A1* | 2/2015 | Hansen | B62D 55/04 |
| | | | 305/165 |
| 2016/0221617 A1* | 8/2016 | Erickson | B60R 3/00 |
| 2017/0113742 A1 | 4/2017 | Tratta et al. | |
| 2018/0037278 A1 | 2/2018 | Cox | |
| 2018/0208256 A1 | 7/2018 | Brazier et al. | |
| 2018/0229783 A1* | 8/2018 | Marchildon | A61G 5/066 |

* cited by examiner

ASSEMBLY FOR CONVERTING A WHEEL DRIVE HARVESTER TO TRACK DRIVE

FIELD OF THE INVENTION

This invention relates to self-propelled agricultural harvester vehicles and other types of heavy self-propelled vehicles. More particularly, this invention relates to apparatus and assemblies which are adapted for converting such vehicles from wheel and tire drive to continuous loop track drive.

BACKGROUND OF THE INVENTION

Commonly known and configured spindle type cotton harvesters have a forward cotton bole picking and processing row unit, and include left and right drive wheels positioned immediately rearwardly from the row unit. In many circumstances, a field of cotton which is ready to be harvested may be excessively wet and muddy. In such circumstances, a cotton farmer having available only a conventional wheel and tire driven cotton harvester may be undesirably forced to choose between driving the harvester over the muddy field and delaying the cotton harvest until the field dries. Such choice often imposes an undesirable dilemma, subjecting the cotton farmer to alternative risks of a harvester stuck in the mud in the cotton field, and loss of harvestable cotton due to a delaying the harvest for field drying.

Such undesirable wet field related cotton harvesting dilemmas give rise to the desirability of a mechanical capacity within a cotton harvester for alternatively including and utilizing a conventional wheel and tire drive system (for dry field harvesting) and a track drive system (for wet field harvesting). However, commonly known and configured cotton harvesters which include a conventional wheel and tire front drive assemblies often position their left and right drive wheels so far forwardly in relation to the row unit that an acceptably large track drive assemblies cannot be alternatively mounted at the former or de-installed locations of the drive wheels.

Also, a conversion of a wheel drive harvester to track drive often solely mounts the track drive at or upon the rotary axis of the track's drive sprocket, resulting in undue stresses imposed upon a hub gear or final drive mounted to the harvester's chassis at that axial location.

The instant inventive assembly solves or ameliorates the problems and challenges discussed above by providing a specially adapted and configured mounting bracket which utilizes a cotton harvester's OEM wheel and hub gear mounts for track bracket support, and which adapts the harvester for utilizing appropriately rearwardly positioned left and right track drives. The instant inventive assembly additionally protects the harvester's hub gears by providing specialized pivoting "Y" brackets for mounting and supporting the interior chassis of the track drive assemblies at separate rotation or pivot axes which underlie the rotation axes of the track drive sprockets.

BRIEF SUMMARY OF THE INVENTION

A first structural component of the instant inventive assembly for retro-fitted conversion of, for example, a self-propelled cotton harvester from wheel drive to track drive may comprise a "U" brace or bracket. In a preferred embodiment, such bracket includes a laterally extending base having left and right ends. References to harvesters and cotton harvesters below are exemplary, and such references are intended to broadly refer to all types of tire driven self-propelled heavy vehicles which may suitably be retro-fitted for track drive.

The assembly's "U" bracket component preferably has a left "U" arm and right "U" arm which are respectively fixedly attached to the left and right ends of the base, such "U" arms extending angularly upwardly. The angular upward extensions of the "U" bracket's arms allow the assembly to provide undergirding support to alternatively installed left and right continuous loop track assemblies while laterally spanning beneath and structurally clearing the harvester's chassis or undercarriage members.

In such embodiment, the "U" bracket's base component is seamed or segmented, the segments being laterally interconnected by an eyed mounting plate, threaded bolts, and threaded nuts combination fastener which allows the base and its laterally attached components to be assembled and disassembled in a modular fashion.

Further structural components of the instant inventive assembly comprise a left setback arm, and a right plurality of arms setback arm, such setback arms preferably being mirroringly identical to each other. In the preferred embodiment, a first arm of each of the setback arms comprises a longitudinally oblongated plate having front and rear ends. The rearward ends of the left and right setback arms are preferably respectively fixedly and rigidly attached to the extreme distal ends of the "U" bracket's left and right "U" arms.

The forward ends of the left and right arm pluralities' first setback arms preferably present specialized matrixes of mounting bolt receiving eyes. Matching matrixes of bolt receiving eyes may typically be found upon a conventional wheel driven cotton harvester's left and right hub gear or final drive mounting plates. Configuration of the setback arms' bolt receiving eyes to match bolt receiving eye patterns previously established upon the harvester's left and right hub gear mounting plates advantageously allows the front or forward ends of such arms to be bolted in place in the same manner as the former installations of the drive wheels which are replaced by the inventive assembly.

Downward extension arm components preferably extend downwardly from the distal ends of the "U" bracket's "U" arms. In the preferred embodiment, such downward extension arms support specially configured left and right "Y" brackets. Cylindrical columns or base portions of such "Y" brackets are rotatably mounted to distal or lower ends of the left and right downward extension arms, while front and rear arm components of the "Y" brackets support the track chassis and idler roller components of the alternatively provided left and right track drive assemblies.

Horizontal extension arm components may preferably extend leftwardly and rightwardly from the distal ends of the "U" bracket's left and right "U" arms. Such horizontal extension arms preferably support eyed mounting plates to which the harvester's left and right hub gears (previously de-installed from their forward tire supporting and driving positions) may be attached. Accordingly, the horizontal extension arms rigidly support the track assembly's drive sprockets in a manner similar to the support of the formerly attached drive wheels. The provision of pivoting left and right "Y" bracket mounts for the track chassis support advantageously reduces stress exerted against the reinstalled hub gears which connect with and rotatably drive the tracks' drive sprockets. To facilitate independent pivoting motion of the track chassis with respect to the rotation axis of the drive sprocket, mechanical linkages between the drive sprocket and the chassis are preferably released.

As indicated above, a novel and useful aspect of the inventive assembly is its provision of track chassis engaging and supporting "Y" brackets which are pivotally mounted at below the distal ends of the "U" bracket's "U" arms. Such "Y" bracket pivot mounts allow the "U" bracket to dually support left and right track drive assemblies at both their drive sprockets and at their idler wheel supporting chassis. Such "Y" configured mounting structures advantageously allow the "U" bracket's support of the track's drive sprockets to be dedicated to rotatably driving those sprockets. While the rotary power is translated to the drive sprockets via interposed hub gears, the major support of the weight of the harvester is provided via the additionally provided track chassis supporting "Y" brackets. The retro-fitted track assemblies support the harvester without unduly stressing the sprocket rotating hub gears by allowing the weight supporting function of the hub gears to be bypassed and transferred to the underlying pivoting track support "Y" brackets.

In use of the instant inventive assembly, an operator of a cotton harvester who needs to use the harvester upon a wet field may easily and conveniently remove the harvester's drive wheels. Thereafter, the harvester's hub gears may be de-installed. Thereafter, the inventive "U" bracket may be conveniently bolted in place with the forward ends of the left and right setback arms being attached in a manner identical to the formerly attached hub gears. Thereafter, left and right track assemblies may be mounted upon the left and right horizontal extension arms with column portions of the track chassis supporting "Y" brackets attaching to the lower ends of the left and right downward extension arms, and with track drive sprockets attached (via interposed hub gears) to mounting plates at the laterally outer ends of the left and right horizontal extension arms. Following such installation, the harvester may be operated in a conventional fashion, but with additional floatation provided by the track assemblies.

During such conventional operation, the weight of the harvester is borne by the pivoting track support "Y" brackets, advantageously relieving stresses which may otherwise translate from the tracks to the "U" bracket via the sprocket driving hub gears.

In circumstances where the harvester's OEM hub gear mount is positioned far enough to the rear of the harvester's header to allow track installations, the "U" bracket component may be omitted and left and right horizontal extension arms combined with underlying pivoting "Y" bracket mounts may be directly installed upon the harvester's OEM hub gear and wheel mounting site. In such configuration, the above described left and right setback arms are not needed, there being no need to rearwardly adjust the position of the sprocket driving hub gears. In such configuration, the inventive assembly may suitably incorporate and install only the above described horizontal extension arms, downward extension arms and "Y" bracket components.

Accordingly, objects of the instant invention include the provision of an assembly for converting a wheel drive harvester to a track drive harvester, which incorporates structures as described above and which arranges those structures in relation to each other for the achievement of beneficial functions as described above.

Other and further objects, benefits, and advantages of the instant invention will become known to those skilled in the art upon review of the Detailed Description which follows, and upon review of the appended drawings.

STATEMENT REGARDING CHARACTER OF DRAWINGS

The drawings described below are photographic in character, and the Applicant does not petition for the allowance of photographic drawings. Notwithstanding, the Applicant asserts that the drawings are such that the prosecution can be carried out without the submission of corrected drawings showing the depicted structures in black lines only. It is, therefore, permissible pursuant to MPEP § 608.02(b) that the drawings be admitted for examination purposes only. Accordingly, the Applicant requests under MPEP § 608.02 (b) that the drawings be admitted for examination purposes only, and that any requirement of submission of corrected drawing pages be held in abeyance until completion of examination.

DETAILED DESCRIPTION OF A PREFERRED EMBODIMENT

Figure 1:
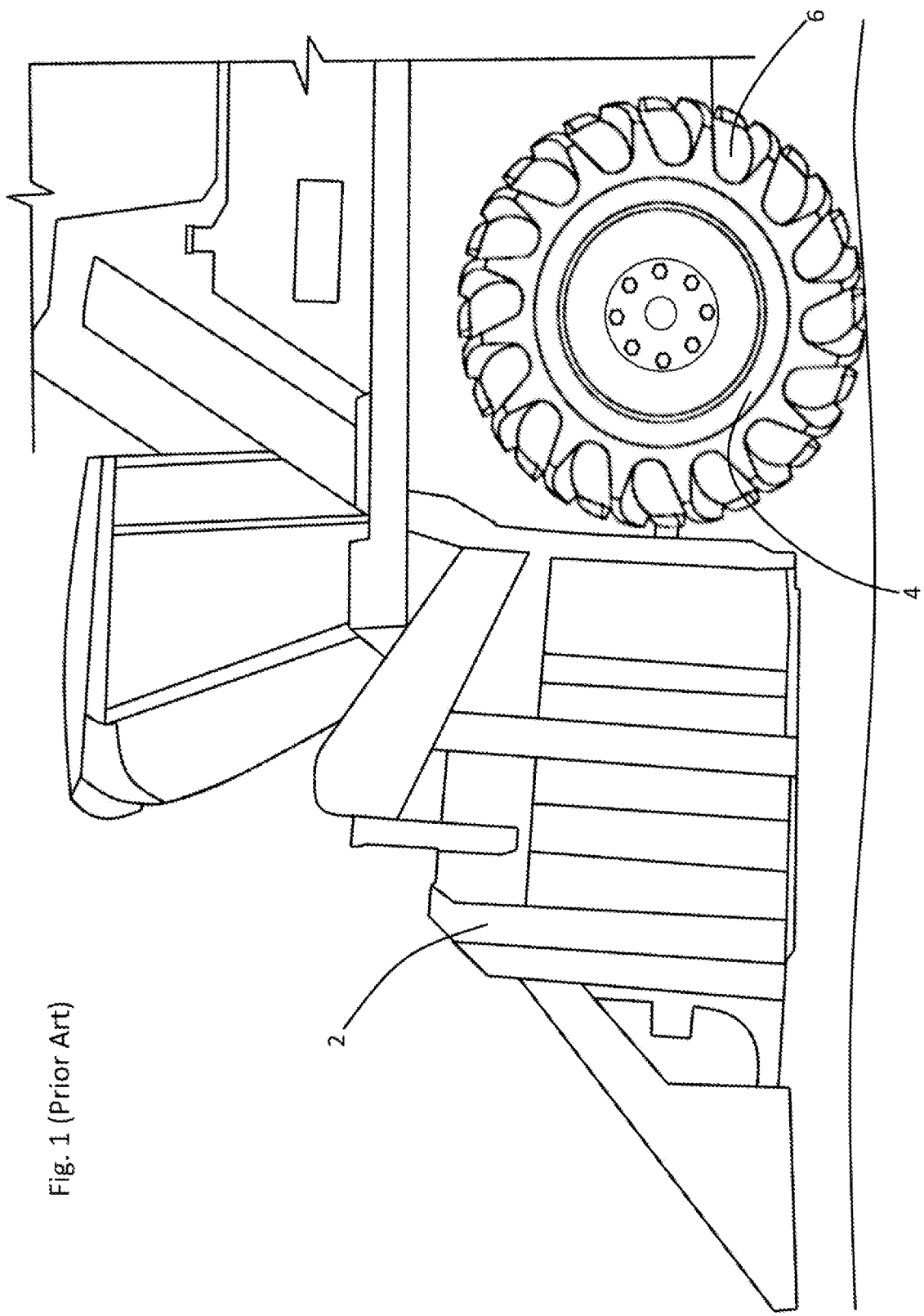
FIG. 1 is a partial left side view of a prior art cotton harvester vehicle.

Referring now to the drawings and in particular to Drawing FIG. 1, a prior art cotton picking and processing harvester has a laterally extending front row unit 2. Functions of picking and processing cotton are performed by the row unit 2 through the action of barbed rotary spindles within the row unit. Cotton fiber which is mechanically doffed from the spindles is rearwardly blown and is formed within the rear of the harvester into a brick or bale module.

Left and right drive wheels 4 having mounted pneumatic tires 6 are conventionally mounted for driving the cotton harvester forwardly over cotton fields. Looking simultaneously to FIGS. 1 and 2, each of the harvester's left and right drive wheel and tire 4,6 combinations is rigidly supported upon the vehicle's chassis or undercarriage 8 by means of a rigid mounting arm 13 to which a mounting plate 10 is rigidly attached. A hub gear or final drive assembly 12 including interior planetary gears (not depicted within views) is rigidly mounted to plate 10 by means of mounting bolts 11, and the drive wheel 4,6 is mounted rotatably at the laterally outer face of such hub gear assembly 12. Structure at the right side of the vehicle depicted in FIG. 1 mirrors and is substantially identical to the above described structures presented at the left side of the vehicle. Where the cotton fields are overly wet and muddy, such drive wheels 4,6 may become undesirably submerged in mud, unduly degrading the field surface or rendering the harvester immobile. Such conventional drive wheel and tire assemblies 4,6 often have insufficient floatation on muddy ground, giving rise to a need for alternatively mounting upon the harvester a higher floatation continuous loop track drive assembly such as is depicted in FIG. 3.

Figure 3:
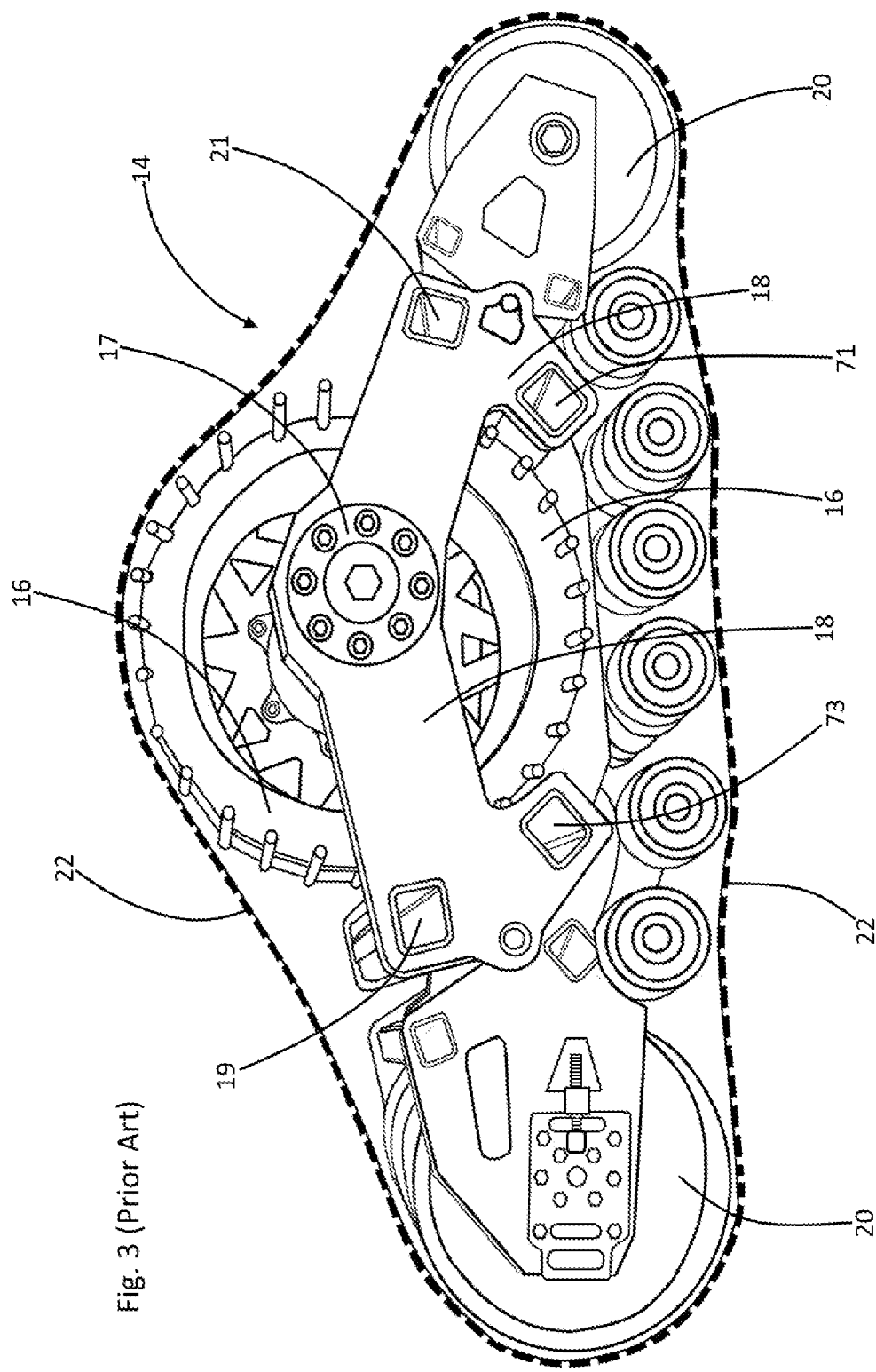
FIG. 3 is a left side view of a prior art continuous loop track drive assembly.

The FIG. 3 track assembly (referred to generally by Reference Arrow 14) has an upper drive sprocket 16, and has multiple idler sprockets 20 which are mounted to a longitudinal track chassis 18. A continuous loop track 22 extends over the upper drive sprocket 16 and about the idler sprockets 20 so that such components reside at the interior of the continuous loop track. The track chassis 18 supports the idler sprockets 20, and a pivoting mount of the chassis 18 and idler sprockets 20 assembly allows the track assembly 14 to deflect and "walk" over obstructions while the drive sprocket 16 continuously provides power and propulsion to the track 22. The sprocket 16 is conventionally mounted to track chassis 18 by rotary bearing 17.

Referring to FIGS. 3-6, the instant inventive assembly advantageously provides an independent pivoting track support "Y" bracket 58. The "Y" bracket 58 has front and rear "Y" arms 61 and 63 which engage the chassis 18 suitably via sliding lateral insertions into chassis frame sockets 19 and 21. Such pin and socket joints 61,19, and 63,21 are considered to be representative of other common and suitably substituted joint fasteners such as bolted plate mounts (not depicted within views) and welded joints.

Figure 8:
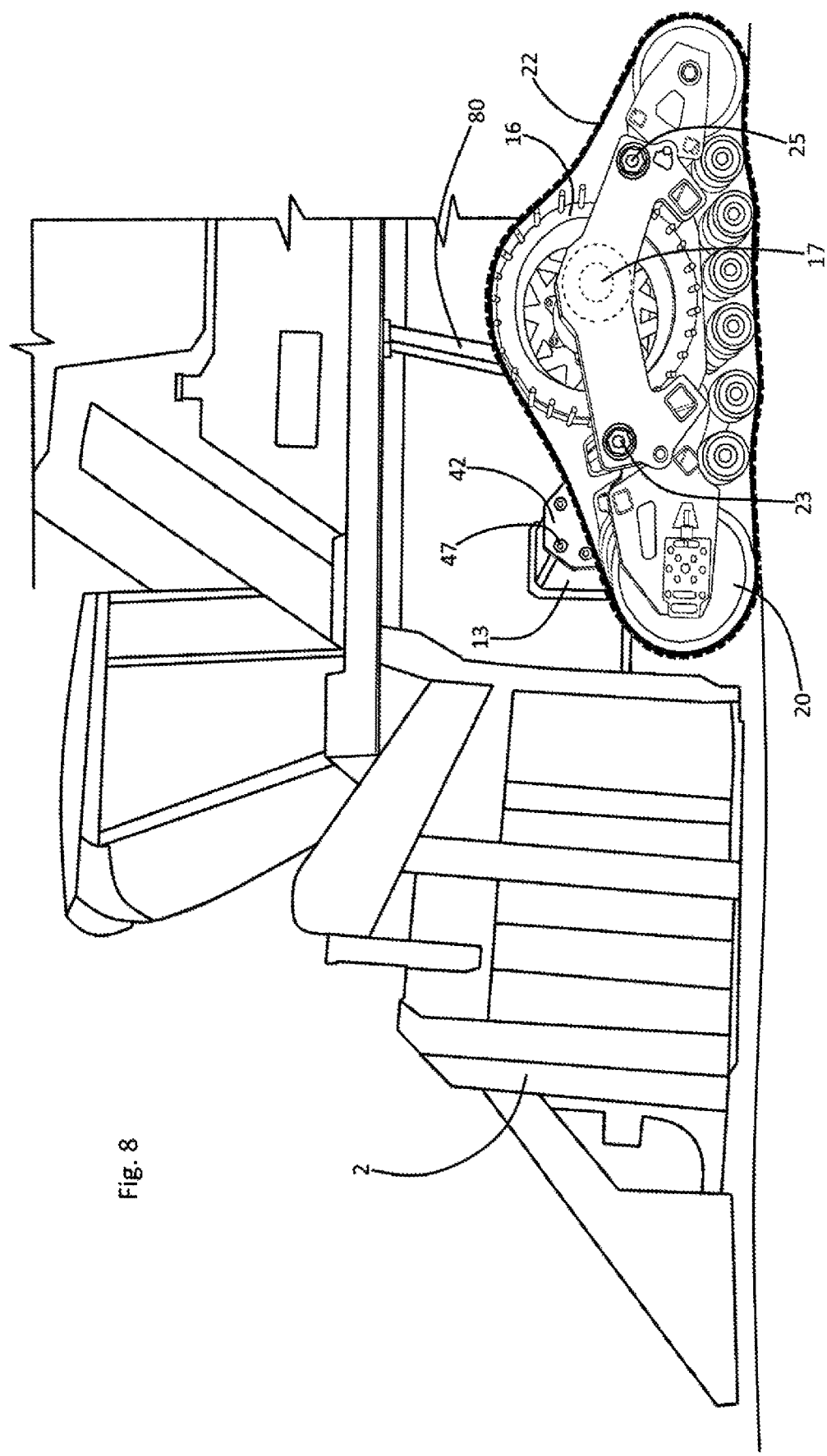
FIG. 8 redepicts the structure of FIG. 7, the view of FIG. 8 further showing the continuous loop track drive assembly of FIG. 3 attached to and supported upon the cotton harvester.

The "Y" bracket 58 is independently pivotally mounted upon a "U" bracket 30,32,40,42 by means of a cylindrical "Y" column 56 which functions as a pivot pin 56, such "Y" component being rotatably received within pivot sleeve 48. As shown in FIG. 8, distal ends of the "Y" arms 61 and 63 are held at their slidably inserted engagements with sockets 19 and 21 via nut and bolt fasteners 23 and 25. The depicted nut and bolt fastened engagements of "Y" arms 61 and 63 with track chassis 18 are considered to be further representative of the commonly known means for mechanically fastening such arm structures to such chassis structures. Additional "Y" arms 59 and 60 (shown in dashed lines) may be provided for further support of the track chassis 18.

Figure 2:
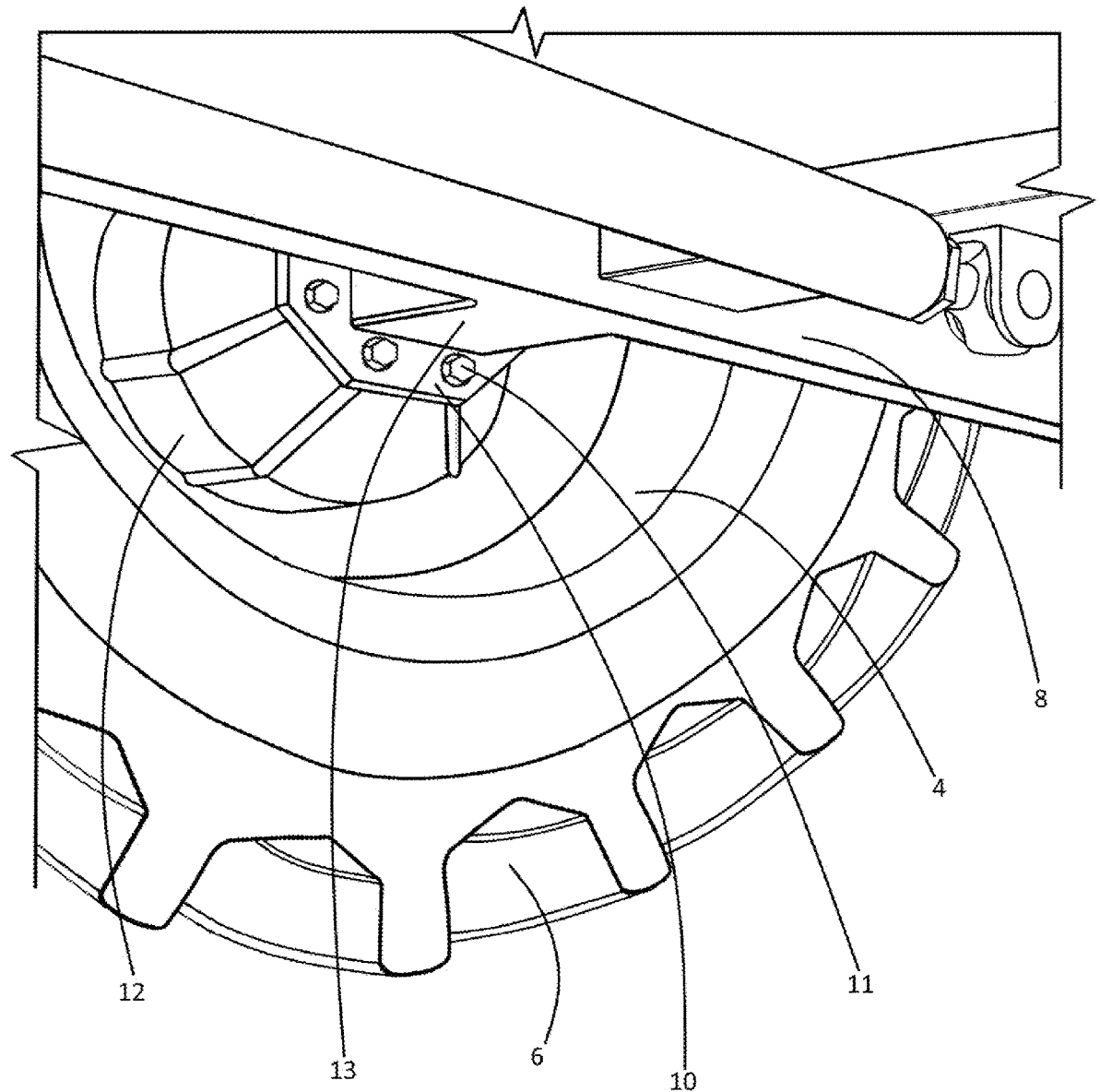
FIG. 2 is a partial undercarriage view of the harvester of FIG. 1, the view showing structures rightwardly underlying the vehicle's left drive wheel.

The instant inventive assembly pivotally supports the track assembly 14 and the chassis 18 upon the "Y" bracket column 56 in lieu of exclusively supporting the track assembly at the rotary axis of the drive sprocket. A final drive component such as hub gear 12 shown in FIG. 2 is mounted between the drive sprocket 16 and a "U" bracket assembly 30,32,40,42 which is referred to generally by Reference Arrow 26. Such hub gear mount conventionally causes a portion of the "U" bracket's support of the track assembly 14 (and the track assemblies' support of the weight of the harvester) to translate through such hub gear. The invention's provision of the underlying pivoting "Y" bracket 58 advantageously lessens out-of-axis stresses and torsion forces that are applied to the such hub gear 12 via the track assembly 14 and its drive sprocket 16. The inventive "Y" bracket assembly allows the portion of the "U" bracket's track support which engages the drive sprocket 16 to substantially exclusively rotatably drive the sprocket, advantageously preventing the hub gear from additionally functioning as a member which must vertically support the mass of the harvester. The invention's dual "Y" bracket support of its left and right track drives 14 protects the sprocket driving hub gears 12 from premature wear and damage resulting from supporting the weight of the harvester during powered driving and turning of the harvester.

Figure 4:
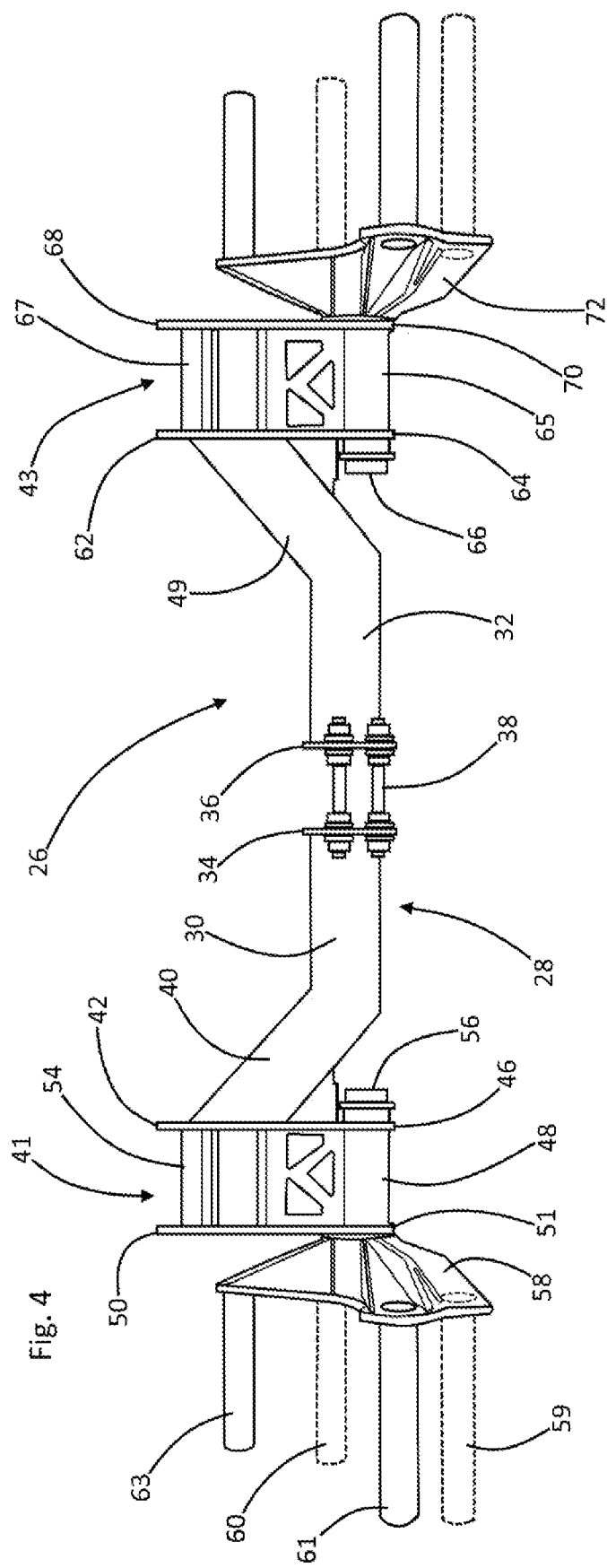
FIG. 4 is a rear view of "U" bracket and "Y" bracket components of the instant inventive assembly.

In addition to its performance of the function of isolating and relieving stresses exerted against sprocket driving hub gears, the instant inventive assembly solves mechanical interference problems associated with retrofitting cotton harvesters with track drives. Referring simultaneously to FIGS. 1-3, it may be seen that mechanical interference may prevent the drive sprocket 16 of the prior art track assembly 14 from being mounted to hub gear 12 in the same manner as the former and de-installed mount of the wheel and tire 4,6. Such mechanical interchange is prevented by the forward extensions of the track assembly 14 which include the forwardmost idler wheels 20 and the front transition of the continuous loop track 22, such forward extensions undesirably impinging against and interfering with the rearward end of the row unit 2. Referring to FIG. 4, the instant inventive "U" bracket assembly is adapted, in addition to its adaptation for performance of the above described hub gear stress relieving function, to resolve such row unit 2/track 14 interference.

Figure 5:
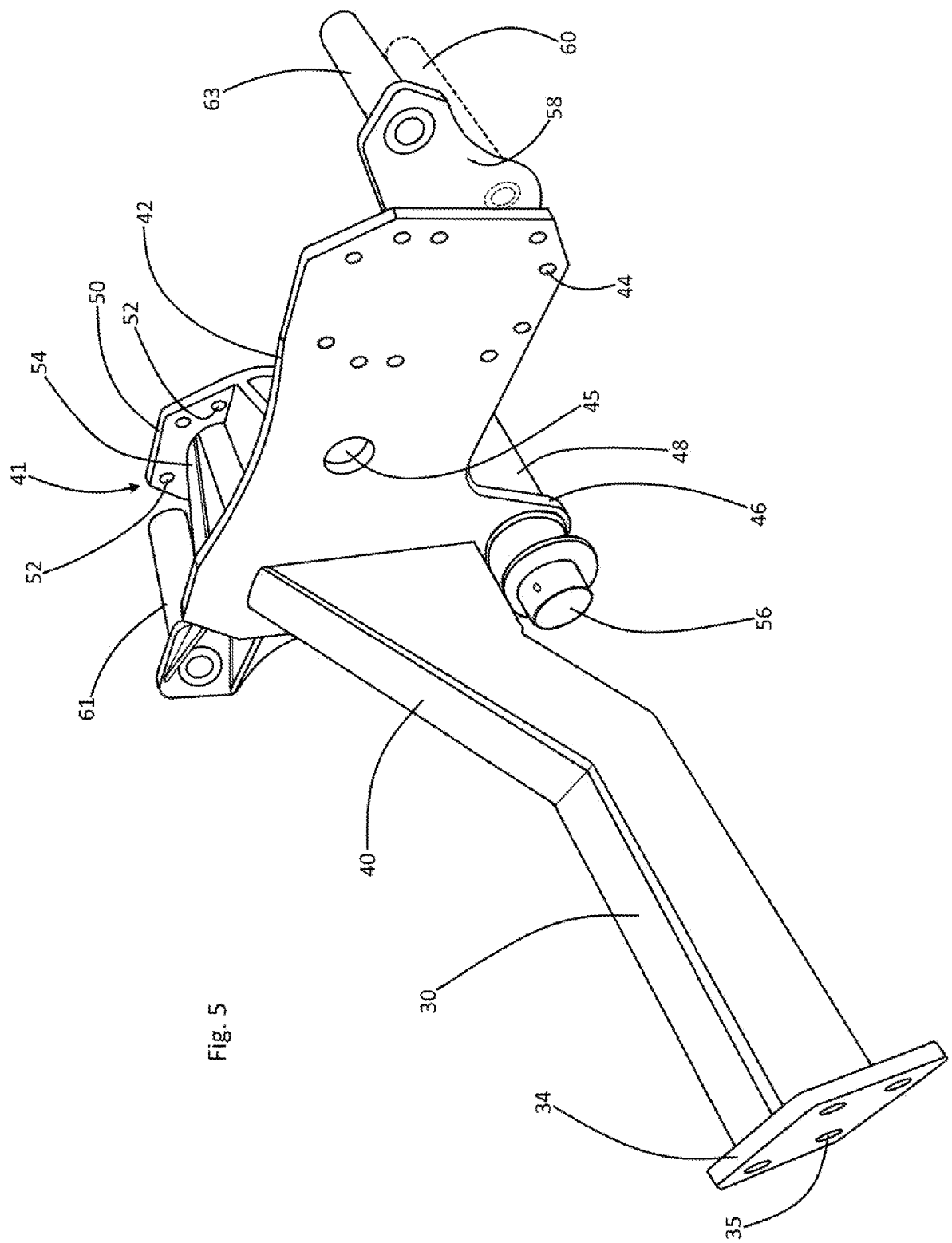
FIG. 5 is a perspective view of a leftward half segment of the structure of FIG. 4.

The assembly 26 conveniently and easily allows track assemblies 14 to be mounted in place of the harvester's conventional drive wheels 4,6. A major structural component of the "U" bracket assembly 26 comprises a "U" base member which is referred to generally by Reference Arrow 28. In a preferred embodiment, the "U" base 28 comprises a laterally extending portion 30,32 which is segmented and is rigidly interconnected by a fastening assembly including mounting plates 34,36 and nut and bolt fasteners 38. Referring further simultaneously to FIG. 5, bolts 38 extend laterally through bolt receiving eyes 35 within plates 34 and 36. While the base member 28 component of the "U" bracket 26 may suitably comprise a rigid and continuous laterally extending beam, such base member is preferably segmented and removably interconnected as indicated in FIG. 4 in order to allow for modular and convenient assembly and disassembly.

Further structural components of the assembly's "U" bracket 26 comprise left and right "U" arms 40 and 49 which are respectively fixedly attached to the left and right ends of the "U" base member 28. In the preferred embodiment, each of the "U" arms 40 and 49 extends upwardly at a 35°-45° angle, such arms respectively extending leftwardly and rightwardly. The upward extensions of arms 40 and 49 advantageously allow the "U" bracket 26 to be mounted without structural interference beneath the cotton harvester's chassis.

Figure 6:
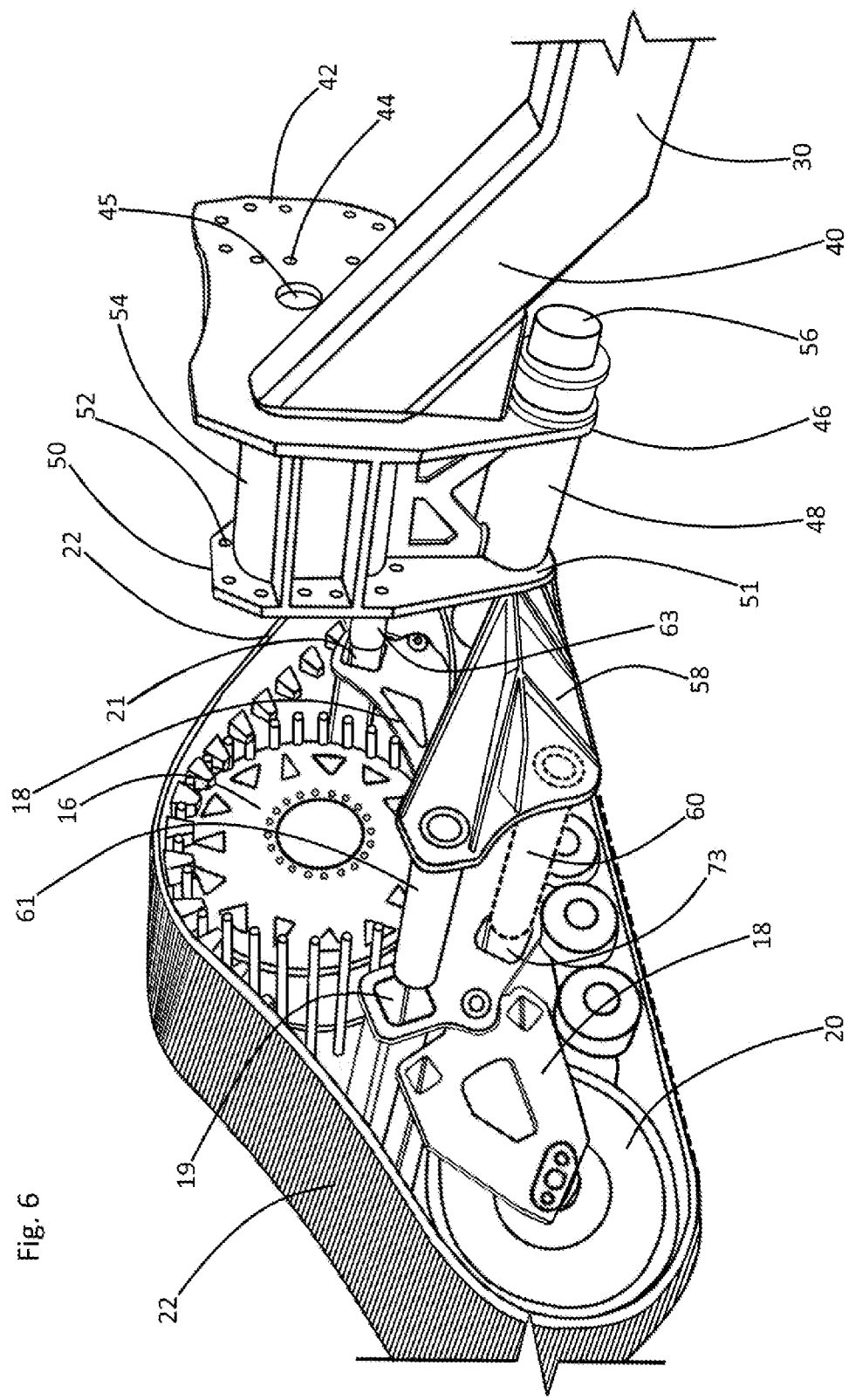
FIG. 6 is an alternative perspective view of the structure of FIG. 5, the view of FIG. 6 further showing in background and in perspective view the continuous loop track drive assembly of FIG. 3.

Referring simultaneously to FIGS. 4-6, a further structural component of the instant inventive assembly comprises a left plurality of varyingly extending arms, such arm plurality being referred to generally by Reference Arrow 41. The left arm plurality 41 preferably comprises first, second, and third arms which are respectively referred to generally by Reference Numerals 42, 46, and 54, each of such arms having a proximal end which is rigidly mounted to the distal end of the "U" bracket's left arm 40.

A first arm 42 of the left plurality of arms 41 functions as a rear setback arm, such arm preferably comprising a heavy steel longitudinally oblongated plate whose rearward end is rigidly welded to the distal end of arm 40, and whose forward end presents a specialized matrix of bolt receiving eyes 44. The longitudinal or front to rear dimension of such setback arm 42 is preferably specially fitted with respect to the longitudinal length of a track assembly, such as track assembly 14 of FIG. 3, to be installed upon the harvester. Correct sizing of the longitudinal dimension of arm 42 assures that the front end of such installed track assembly will clear and avoid interference with the rearward end of the harvester's row unit 2. Where there is no mechanical interference between the tracks 14 and the row unit 2, the rearward position adjusting setback arms of the invention's left and right arm pluralities may be omitted.

Referring to FIG. 2, it may be seen that the harvester's left hub gear mounting plate 10 includes a matrix of bolt receiving eyes for receipt of mounting bolts 11. As manufactured, the intended function of plate 10 is to facilitate a rigid mount of a left hub gear or final drive assembly 12 upon chassis members 8. In the preferred embodiment of the instant inventive assembly, the specialized matrix of bolt receiving eyes 44 which is formed at the forward end of setback arm 42 is substantially identical to the matrix of eyes within mounting plate 10. Such matching of bolt receiving eye patterns advantageously allow the forward end of the left setback arm 42 to be rigidly bolted to mounting plate 10 in the same manner as the former or de-installed installed mount of hub gear 12 upon such plate. Nut and bolt fasteners 47 shown in FIG. 7 demonstrate such setback arm 42 to plate 10 mount.

Figure 7:
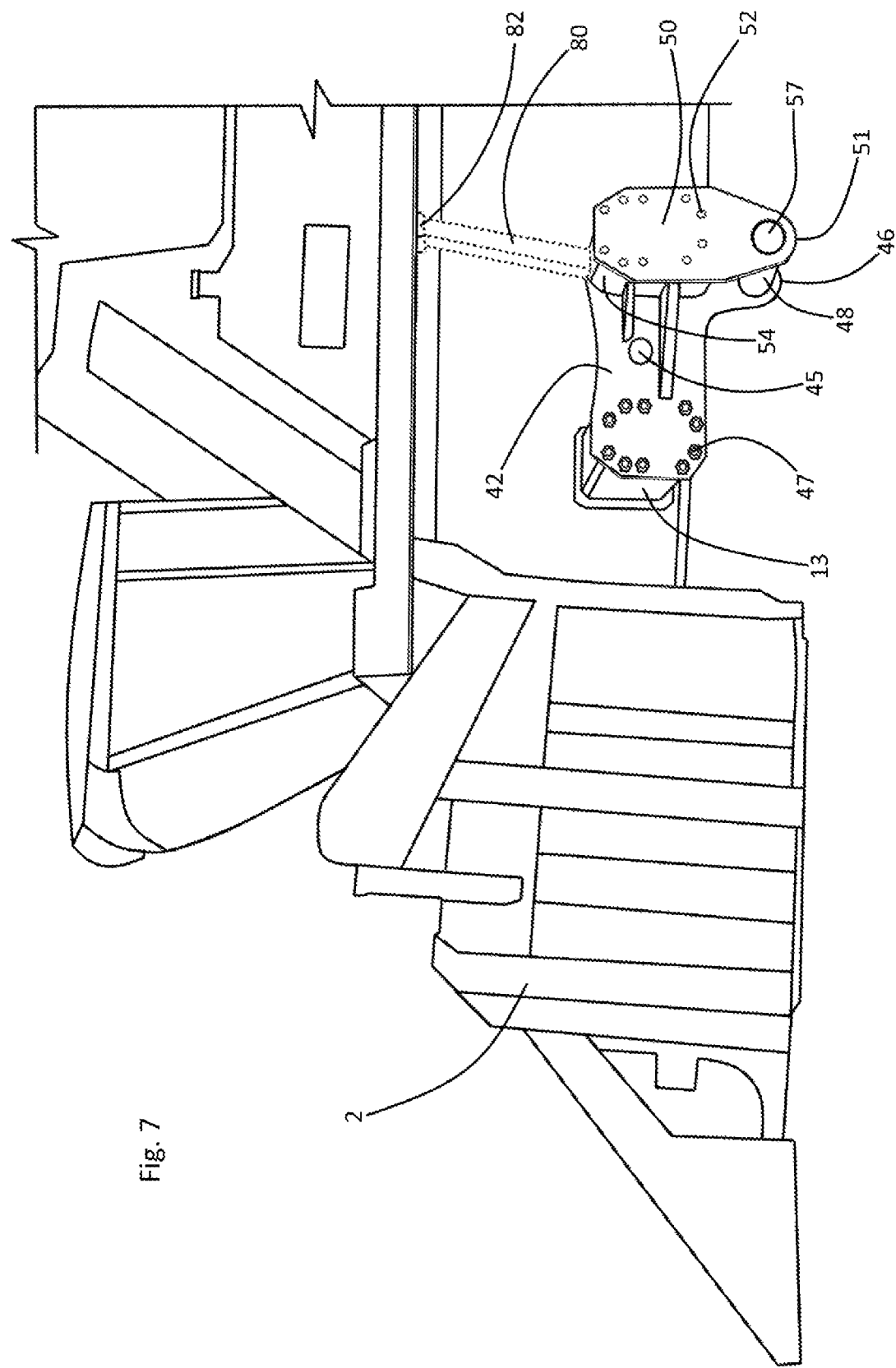
FIG. 7 is a left end view of the bracket assembly of FIG. 4, the view of FIG. 7 further showing in partial side view the FIG. 1 cotton harvester to which such assembly has been alternatively mounted.

Referring to FIG. 6, the second arm 46 of the assembly's left plurality of arms 41 preferably comprises a downward extension arm which extends downwardly from the distal end of the left "U" arm 40, such downward extension arm 46 preferably rigidly mounting and supporting a pivot sleeve 48. Referring further to FIG. 7, such sleeve 48 forms and defines a laterally opening "Y" bracket column receiving rotary bearing or bore 57, the pivot sleeve 48 receiving and rotatably supporting the cylindrical pivot pin or axle configured "Y" bracket column 56 within bore 57. The laterally outer end of the "Y" bracket column 56 rigidly supports proximal ends of the "Y" bracket's front and rear arms, the distal ends of which are suitably configured as slide pins 61 and 63. Such "Y" bracket arm distal ends 61 and 63 are specially adapted for engaging and supporting a specially configured track chassis member (such as chassis 18). In the "Y" bracket 58/track chassis 18 engagement example of FIGS. 3, 6, and 8, "Y" bracket arm distal ends 61 and 63 slidably insert into and are received within tubular chassis voids 19 and 21 in the manner of pin and socket joints. In such slidably received engagements, the extreme distal ends of the "Y" bracket arms 61 and 63 may be secured against lateral sliding extractions with respect to chassis 18 by cap plate, nut and bolt fasteners 23 and 25. The "Y" bracket arm to chassis engagement depicted in FIGS. 3, 6, 8, is intended to be representative of other commonly known fasteners such as eyed mounting plate and bolt combination fasteners (not depicted within views) and welded joints which may suitably alternatively securely interconnect the pivoting "Y" bracket and the track's chassis. The dashed line arms 60 and 59 shown in dashed lines in FIGS. 4, 5, and 6 suitably constitute additional "Y" arms which, similarly with arms 61 and 63, may be slidably received and secured within chassis voids 71 and 73.

The exemplary left track drive assembly 14 is supported at the left end of "U" bracket 26 by the pivotally mounted "Y" bracket 56, such mount facilitating pitching and counter-pitching motions of the track assembly 14 with respect to the "U" bracket 26 and the harvester. Such pivoting "Y" bracket pin mount 56 advantageously allows the inventive assembly to support the weight of the harvester without translating the weight through overlying hub gears. Referring simultaneously to FIGS. 3, 5, and 8, independent pivoting of the "Y" bracket 58 and its attached track 14 with respect to the "U" bracket 26 is preferably actuated via removal of the rotary bearing 17 interconnection of sprocket 16 and track chassis 18.

The third arm 54 of the assembly's left plurality of arms 41 preferably comprises a rigid horizontal extension arm or column 54 which is fixedly attached to and extends leftwardly from the rearward end of setback arm 42 and/or from the distal end of "U" arm 40. In a preferred embodiment, a mounting plate 50 having a matrix of bolt receiving eyes 52 is rigidly mounted to the leftward or distal end of the horizontal extension arm 54. Such mounting plate 50 preferably includes a matrix of bolt receiving eyes 52 which is configured substantially identically with that of the hub gear mounting plate 10, and with eye matrix 44. Such matching configuration of the eye matrix of plate 50 advantageously allows the harvester's left hub gear 12 to be de-installed from plate 10 and to be rearwardly and laterally outwardly reinstalled upon mounting plate 50. In such reinstallation of hub gear 12, the same mounting bolts 11 which were formerly utilized to mount the hub gear upon mounting plate 10 may be utilized for the alternative mount of the hub gear upon the horizontal extension arm 54. In the preferred embodiment, the drive sprocket 16 of track assembly 14 is mounted to such reinstalled hub gear 12 in the same manner as the former attachment of wheel and tire 4,6 thereto.

In a preferred embodiment, the downward extension arm component 46 of the left arm triple 41 further comprises and incorporates a downward extension 51 of plate 50, such extension 51 advantageously providing additional support to the laterally outer or leftward end of pivot sleeve 48. Also in the preferred embodiment, the left setback arm 42 includes a drive shaft passage aperture 45 for facilitation of a laterally leftward extension of a rotary drive shaft (not depicted within views) for powering the reinstalled hub gear 12.

Referring to FIG. 4, the instant inventive bracket assembly 26 preferably further comprises a right plurality of arms, such arms being referred to generally by Reference Arrow 43. Arm pluralities 41 and 43 constitute an arm plurality pair component of the inventive assembly. In the preferred embodiment, the right arm plurality 43 is configured mirroringly and substantially identically with the left arm plurality 41, such right arm plurality 43 suitably comprising a right setback arm 62, a right downward extension arm 64,70 which supports a sleeve 65 and pivoting "Y bracket column 66, and a laterally rightwardly extending horizontal extension arm and mounting plate combination 67,68. The right "Y" bracket 72 is mounted similarly with the left "Y" bracket 58, such right "Y" bracket supporting a right track drive assembly (not depicted within views) which mirrors and is substantially identical to the left track drive assembly 14.

Referring to FIG. 7, in order to oppose counterclockwise (according to view) torsion of left setback arm 42 about shaft 13 and about mounting bolts 47, a vertical strut 80 (shown in dashed lines) may extend upwardly from the left horizontal extension arm 54 to an overlying buttressing point 82 upon the frame of the harvester. Alternatively, the lower end of such strut may be anchored upon the distal end of the left "U" arm 40. A similarly configured strut (not within views) may buttress and oppose torque exerted by the right setback arm 62.

A reversal of the de-installation and installation steps described above easily and conveniently reconfigures the harvester from track drive to conventional wheel drive.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A retrofit assembly for conversion of a wheel driven vehicle to track drive, said vehicle having an undercarriage and having left and right final drive mounts, said assembly comprising:
   (a) left and right setback arm, each arm among the left and right setback arms having a forward end and a rearward end, wherein the left and right setback arms are respectively fixedly attached to and respectively extend rearwardly from the vehicle's left and right final drive mounts;
   (b) a "U" bracket having left and right "U" arms, wherein the "U" bracket is fitted for laterally spanning the vehicle beneath the undercarriage, and wherein distal ends of the left and right "U" arms are respectively fixedly attached to the rearward ends of the left and right setback arms;
   (c) left and right final drives respectively fixedly attached to the left and right setback arms, wherein the left final drive is positioned at the rearward end of the left setback arm, and wherein the right final drive is positioned at the rearward end of the right setback arm; and
   (d) left and right tracks, said tracks respectively incorporating left and right drive sprockets, wherein each such track has a chassis, and wherein the left and right drive sprockets are respectively fixedly attached to the left and right final drives.

2. The retrofit assembly of claim 1 wherein the fixed attachments of the left and right final drives to the left and right setback arms respectively comprise left and right horizontal extension arms.

3. The retrofit assembly of claim 2 comprising left and right "Y" brackets, each such bracket having a front "Y" arm, a rear "Y" arm, and a cylindrical "Y" column, said retrofit assembly further comprising left and right pivot mounts respectively receiving the left and right "Y" brackets' cylindrical "Y" columns, said retrofit assembly further comprising left and right downward extension arms which respectively fixedly suspend the left and right pivot mounts below distal ends of the left and right "U" arms, wherein the left and right "Y" brackets' "Y" arms are respectively fixedly attached to the left and right tracks' chassis.

4. The retrofit assembly of claim 3 wherein the "U" bracket comprises a horizontally extending base member having left and right ends, and wherein the left and right "U" arms respectively extend angularly upward from said ends.

5. The retrofit assembly of claim 4 wherein the "U" bracket is laterally segmented into left and right halves, and further comprising bolt fasteners removably interconnecting said halves.

6. The retrofit assembly of claim 5 further comprising left and right struts respectively spanning vertically between the left and right horizontal extension arms and the vehicle's undercarriage, or between distal ends of the left and right "U" arms and the vehicle's undercarriage.

* * * * *